United States Patent [19]
Arata

[11] Patent Number: 4,788,610
[45] Date of Patent: Nov. 29, 1988

[54] AUTOMATIC RECORDING APPARATUS
[75] Inventor: Tadao Arata, Inagi, Japan
[73] Assignee: Tanashin Denki Co., Ltd., Japan
[21] Appl. No.: 78,688
[22] Filed: Jul. 28, 1987
[30] Foreign Application Priority Data
  Jan. 23, 1987 [JP] Japan .............................. 62-8384[U]
[51] Int. Cl.⁴ ............................................. G11B 15/00
[52] U.S. Cl. ................................... 360/96.3; 360/137
[58] Field of Search ...................... 360/96.3, 96.4, 137;
  242/197–200, 204

[56]  References Cited
  U.S. PATENT DOCUMENTS
  4,554,601  11/1985  Sugihara ............................... 360/90

Primary Examiner—A. J. Heinz
Attorney, Agent, or Firm—Wegner & Bretschneider

[57] ABSTRACT

An automatic recording apparatus which is simplified in construction and reduced in number of parts and in overall size without having a bad influence on an automatic recording function thereof. In the apparatus, a stand-by mode selecting operating member manually pushed in to an actuated position is arrested by an arresting member. In the actuated position of the operating member, rotation of a rotary member is stopped and a reel receiver is disconnected from the rotary member. After lapse of a preset time, rotation of the rotary member is started again. Within one full rotation of the rotary member, the arresting member is moved out of arresting engagement with the operating member by a turning force of the rotary member so that the operating member is returned to its home position, thereby allowing the automatic recording apparatus to start a recording operation.

12 Claims, 3 Drawing Sheets

AUTOMATIC RECORDING APPARATUS

BACKGROUND OF THE INVENTION

1. Field of the Invention

This invention relates to an automatic recording apparatus for use with a tape recorder or the like.

2. Description of the Prior Art

Automatic recording apparatus consisting of a tape recorder having an automatic recording function have been widely used so far. Such an automatic recording apparatus normally includes, in combination, a timer, a pause operating member and a pause mechanism. In particular, a recording operating member is pushed in and arrested to an actuated position to move and arrest a magnetic head, a pinch roller and a rotation transmitting route to respective recording operation positions, and then a pause operating member is pushed in and arrested to an actuated position to cause a pause mechanism to compulsorily establish a recording mode stand-by condition. After then, at a time when an interval of time set to a timer elapses, a power source for a magnetic tape feeding motor and a recording/reproducing circuit is made available while at the same time the pause operating member is released from the arrested position by means of an electromagnetic plunger in order to start a recording operation.

Such an automatic recording apparatus as described above has a drawback that it is complicated in construction and includes a comparatively large number of parts with a comparatively large overall size of the apparatus because it employs an electromagnetic plunger for releasing an arrested condition of a stand-by mode selecting operating member.

SUMMARY OF THE INVENTION

It is an object of the present invention to provide an automatic recording apparatus which is simplified in construction and reduced in number of parts and in overall size without having a bad influence on an automatic recording function thereof.

In order to attain the object, according to the present invention, there is provided an automatic recording apparatus which comprises a normally rotating rotary member, a reel receiver normally connected to said rotary member for rotating a tape reel received thereon, a stand-by mode selecting operating member manually movable from a home position to an actuated position and normally urged to the home position, arresting means for arresting said stand-by mode selecting operating member at the actuated position, a pause mechanism for interrupting a rotation transmitting route from said rotary member to said reel receiver to establish a recording mode stand-by condition when said stand-by mode selecting member is at the actuated position, controlling means responsive to movement of said stand-by mode selecting operating member from the home position to the actuated position for stopping rotation of said rotary member and responsive to a starting signal for starting rotation of said rotary member, and releasing means for transmitting a turning force of said rotary member at an initial stage after starting of its rotation to move said arresting means out of arresting engagement with said stand-by mode selecting operating member to allow said stand-by mode selecting operating member to return from the actuated position to the home position, thereby canceling the recording mode stand-by condition.

In the automatic recording apparatus, if a recording operating member is manually pushed in to its actuated position and then the stand-by mode selecting operating member (pause operating member) is pushed in to its actuated position, the stand-by mode selecting operating member is arrested at its actuated position. In response to the movement of the stand-by mode selecting operating member to the actuated position, rotation of the rotary member which started in response to the operation of the recording operating member is stopped and a recording mode stand-by condition is established by the pause mechanism. After then, when a starting signal is received, for example, from a built-in timer, rotation of the rotary member is started again while operation of a recording/reproducing circuit of the apparatus is also started. Within one full rotation of the rotary member, the releasing means is operated by the rotary member to move the arresting means out of arresting engagement with the stand-by mode selecting operating member. Consequently, the stand-by mode selecting operating member is returned to its home position by the urging force acting thereupon, which causes the pause mechanism to cancel the recording mode stand-by condition, thereby allowing the automatic recording apparatus to start a recording operation.

The above and other objects, features and advantages of the present invention will become apparent from the following description and the appended claims, taken in conjunction with the accompanying drawings.

DESCRIPTION OF THE PREFERRED EMBODIMENTS

Figure 1:
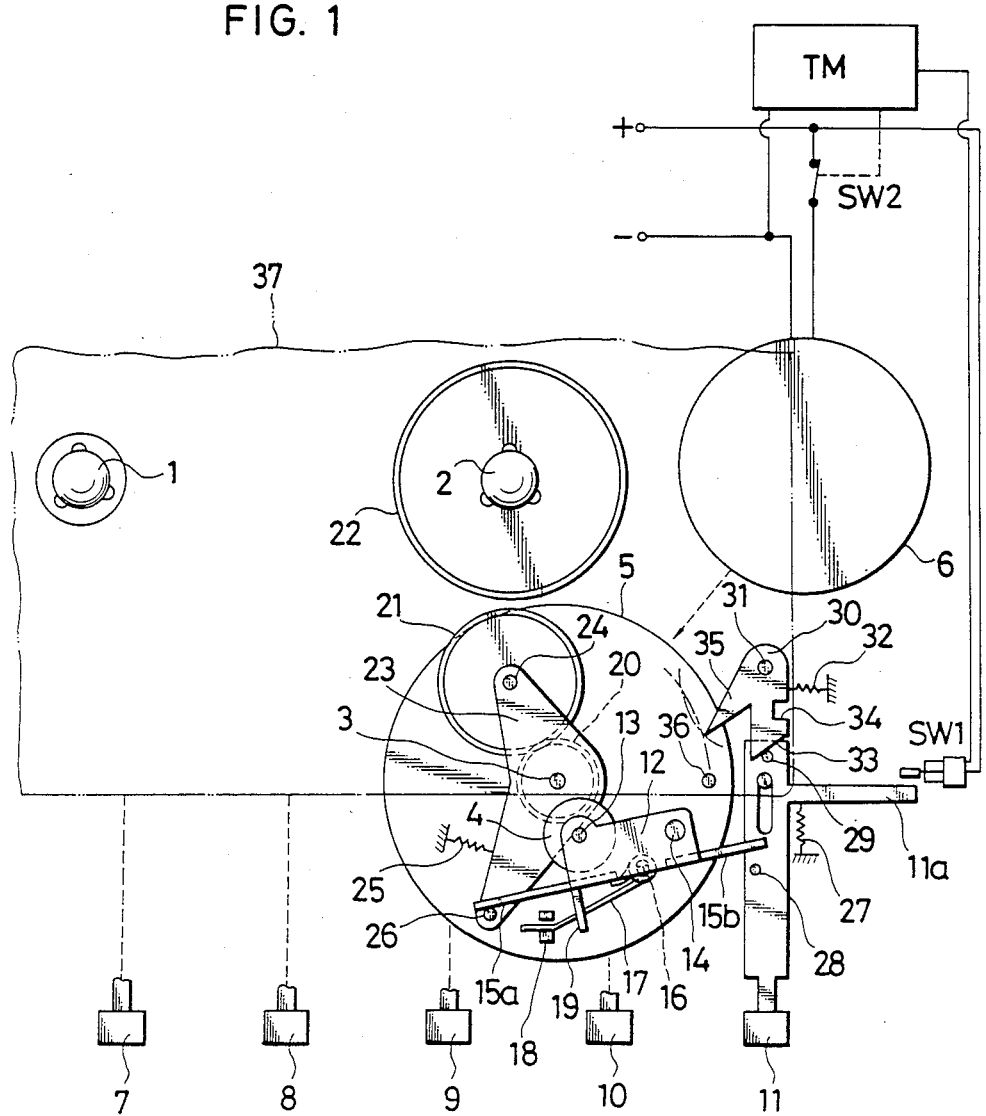
FIG. 1 is a schematic plan view illustrating general construction of an automatic recording apparatus of a preferred embodiment of the invention.

Referring first to FIG. 1, there is shown general construction of an automatic recording apparatus of a preferred embodiment of the invention. In the embodiment shown, the automatic recording apparatus of the invention is incorporated in a tape recorder of the cassette type. Since the tape recorder itself is of the known type, only those parts which relate to the present invention are shown in FIG. 1.

The tape recorder shown includes a reel receiver 1 for supporting thereon a reel which supplies a tape therefrom upon recording or reproducing operation of the tape recorder, another reel receiver 2 for supporting another reel which winds a tape thereon upon recording or reproducing operation of the tape recorder, a capstan shaft 3, a pinch roller 4, a fly-wheel 5 secured to the capstan shaft 3, and a motor 6 for supplying turning power via the fly-wheel 6 to feed a tape. The tape recorder further includes a fast feeding operating member 7, a stopping operating member 8, a reproducing operating member 9, a recording operating member 10, and a pause operating member (stand-by mode selecting operating member) 11. The tape recorder additionally includes a rewinding operating member not shown. All the operating members are designed such that they may be individually manually pushed in from home positions to actuated positions and may be automatically returned from the actuated to the home positions when allowed. Particularly, if any of the operating members 7, 9 and 10 and the rewinding operating member is pushed in to its actuated position, it is arrested to the actuated position by a common arresting mechanism not shown, and then if the stopping operating member 8 is pushed in to its actuated position, the operating member in its arrested position is released from the arresting mechanism and thus returned to its home position.

The pinch roller 4 is supported for rotation on a shaft 13 at one end of a pinch lever 12 which is supported at the other end thereof for pivotal motion on a fixed shaft 14. An arm 15a of a predetermined length extends integrally from a portion of the one end of the pinch lever 12 spaced from the shaft 13. Another arm 15b extends similarly from the other end of the pinch lever 12 to a position above the pause operating member 11. The pinch lever 12 has a spring receiving lug 16 formed thereon, and a torsion coil spring 17 is fitted on the spring receiving lug 16 for urging the pinch lever 12 in a clockwise direction around the fixed shaft 14. One end of the coil spring 17 is held by the pinch lever 12 while the other end is held by a projection 18 formed on a magnetic head supporting plate not shown which is moved forward (upward in FIG. 1) when the reproducing operating member 9 or the recording operating member 10 is pushed in to its actuated position. The maximum angle of pivotal motion of the pinch lever 12 by the coil spring 17 is defined by an abutting arm 19 extending laterally from the pinch lever 12. Accordingly, when, for example, the recording operating member 10 is pushed in, the magnetic head supporting plate is moved forward to cause the pinch lever 12 to pivot in the clockwise direction around the fixed shaft 14. Then, when the recording operating member 10 is fully pushed in and arrested by the arresting mechanism not shown, the pinch roller 4 is contacted under pressure with the capstan shaft 3 by an urging force exerted by the coil spring 17.

The motor 6 and a recording/reproducing circuit not shown are connected to a power source normally when any of the fast feeding operating member 7, reproducing operating member 9, recording operating member 10 and rewinding operating member not shown is pushed in to its actuated position, as in a conventional tape recorder.

The turning force of the motor 6 is transmitted to the capstan shaft 3 via the fly-wheel 5 and is also transmitted selectively to the reel receivers 1, 2 via respective power transmitting systems. Here, the turning force transmitting route to the reel receiver 2 which serves as winding means upon recording or reproducing operation of the tape recorder will be described as an example. In particular, a gear 20 is secured to the capstan shaft 3 and is connected to transmit a turning force thereof to the reel receiver 2 via gears 21, 22 and a friction clutch not shown. The gear 21 is mounted for rotation on a shaft 24 at an end of a lever 23 supported for rocking motion around the capstan shaft 3 and is normally held in meshing engagement with the gear 20. The lever 23 is normally urged to pivot in a clockwise direction around the capstan shaft 3 by a spring 25. The clockwise pivotal motion of the lever 23 is controlled by engagement of a pin 26 located at the other end of the lever 23 with the arm 15a of the pinch lever 12. In particular, the pin 26 is normally engaged with the arm 15a to hold the lever 23 from further pivoting in the clockwise direction. In this position, the gear 21 is held out of meshing engagement with the gear 22. However, if the reproducing operating member 9 or the recording operating member 10 is pushed in to its actuated position to advance the magnetic head supporting plate, the pinch lever 12 is pivoted in the clockwise direction by the magnetic head supporting plate to pivot the lever 23 in the clockwise direction around the capstan shaft 3 to move the gear 21 into meshing engagement with the gear 22.

The pause operating member 11 is normally urged by a spring 27 in a direction opposite to the direction of movement thereof by manual pushing in operation so that it may be automatically returned from its actuated to its home position when allowed. The pause operating member 11 has a pressing pin 28 erected uprightly at a mid portion of an upper face thereof for pressing against the arm 15b of the pinch lever 12 to compulsorily pivoting the pinch lever 12 in the counterclockwise direction around the shaft 14 when the pause operating member 11 is pushed in to its actuated position. The pause operating member 11 further has a lateral projection 11a formed at a side thereof for operation of a switch SW1 connected to a timer TM which is in turn connected to open or close another switch SW2 for the motor 6. The switch SW1 may be a conventional mechanical switch or any other switch only if it can detect movement of the pause operating member 11 while the other switch SW2 may be a mechanical switch or an electronic switch such as, for example, a transistor.

The pause operating member 11 has another arresting pin 29 erected uprightly at an end portion of the upper face thereof. Located in front of the abutting pin 29 is an arresting plate 30 for arresting the pause operating member 30 at its actuated position. The arresting plate 30 is supported for pivotal motion on a fixed shaft 31 and is normally urged in the counterclockwise direction by a spring 32. The arresting plate 30 has formed thereon an inclined end face 33 for converting a pressing force of the arresting pin 29 when the pause operating member 11 is pushed in to its actuated position into a force to pivot the arresting plate 30 in the clockwise direction, an arresting shoulder 34 for arresting the arresting pin 29 after passing the inclined end face 33, and a pawl 35 which extends toward and above the fly-wheel 5.

Meanwhile, a releasing pin 36 is erected uprightly on an upper face of the fly-wheel 5. The releasing pin 36 is located such that it will not engage with the pawl 35 of the arresting plate 30 when the arresting plate 30 is not arrested at its actuated position as shown in FIG. 1 but it will engage with the pawl 35 when the pause operating member 11 is arrested at its actuated position by the arresting plate 30. It is to be noted that reference numeral 37 in FIG. 1 denotes a tape cassette loaded in position in the tape recorder.

Now, operation of the automatic recording apparatus having the construction described above will be described.

At first, when normal recording or reproduction is to be performed on the automatic recording apparatus, a tape cassette 37 will be loaded in position into the automatic recording apparatus and then the recording operating member 10 or the reproducing operating member 9 will be pushed in until it is arrested at its actuated position. By this operation, the magnetic head supporting plate is held to its advanced position while the pinch roller 5 is pressed against the capstan shaft 3 with a magnetic tape held therebetween, and the lever 23 is pivoted in the clockwise direction to mesh the gear 21 with the gear 22. Meanwhile, the motor 6 and the recording/reproducing circuit are connected to the power source. Consequently, the capstan shaft 3 and the reel shaft 2 are driven to rotate, thereby effecting recording or reproducing operation. In this instance, if the fast feeding operating member 7 is pushed in, then fast feeding of the tape will be performed, or otherwise if the stopping operating member 8 is pushed in, then the automatic recording apparatus will be stopped.

Figure 2:
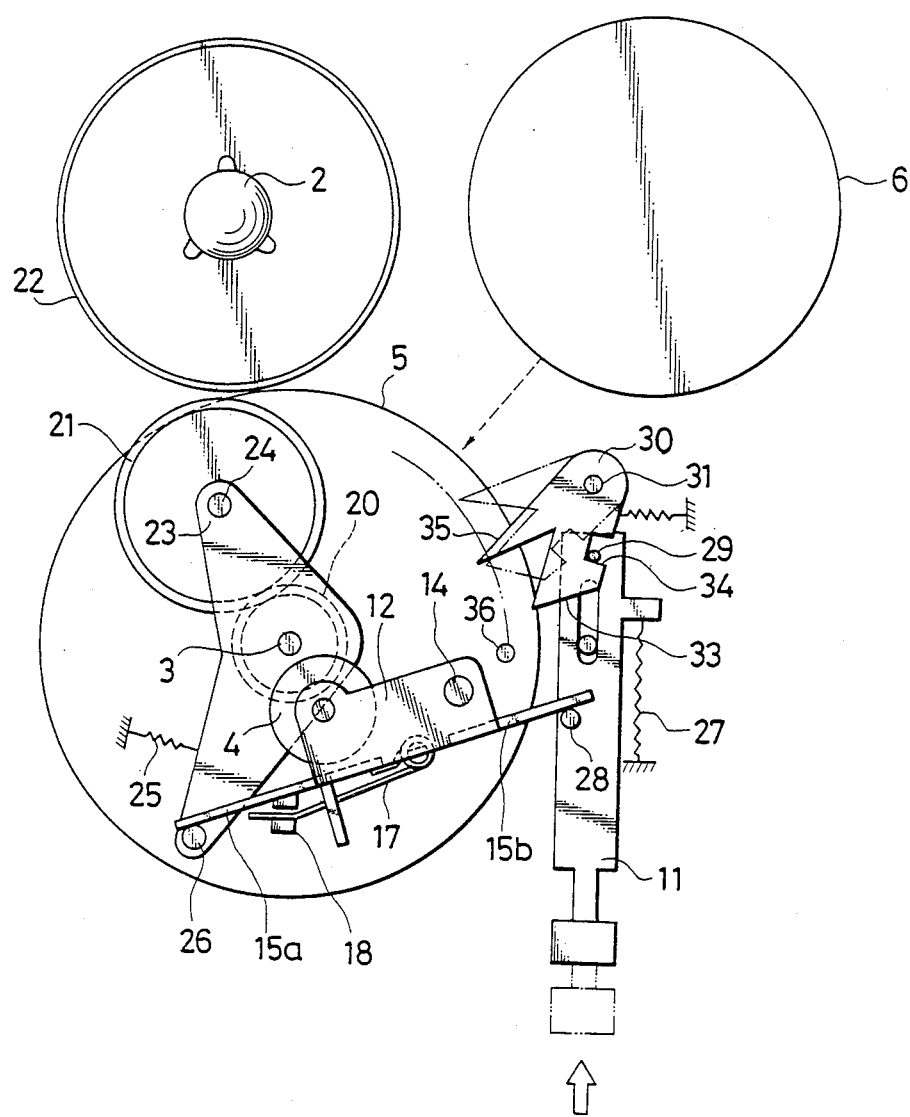
FIG. 2 is a schematic plan view illustrating, in a somewhat enlarged scale, operation of the automatic recording apparatus of FIG. 1.

On the other hand, when so-called automatic recording wherein recording is performed for a predetermined period of time after lapse of a predetermined interval of time is to be performed, the automatic recording apparatus will be operated as follows. In particular, at first the timer TM will be set to a predetermined interval of time by an operator of the tape recorder. Then, the recording operating member 10 will pushed in until it is arrested at its actuated position. By the operation, the magnetic head supporting plate is advanced to cause the pinch roller 4 to be pressed against the capstan shaft 3 with a magnetic tape held therebetween and to cause the gear 21 to be meshed with the gear 22. Meanwhile, the motor 6 and the recording/reproducing circuit are connected to the power source to start recording operation of the tape recorder. Subsequently, the pause operating member 11 will be pushed in until the arresting pin 29 thereon is arrested by the arresting shoulder 34 of the arresting plate 30. During the forward movement of the pause operating member 11, the lateral projection 11a thereof operates the switch SW1 to deliver a pulse signal therefrom to the timer TM. In response to a rising edge of the pulse signal, the timer TM starts its operation to measure a time. Such operation of the timer TM opens the switch SW2 which is normally in its closed position so that the motor 6 is disconnected from the power source to stop the recording operation of the tape recorder once started. It is to be noted that, though not specifically shown, the recording/reproducing circuit is associated in a similar manner with the timer TM so that while the timer TM is operating, the recording/reproducing circuit is held inoperative. On the other hand, after the pause operating member 11 has been moved to and arrested at its pushed in position as described above, the arresting plate 30 is held at a position pivoted a little in the clockwise direction from its initial position as apparently seen from FIGS. 1 and 2. Consequently, the terminal end of the pawl 35 of the arresting plate 30 assumes a position a little inwardly of a locus of turning movement of the releasing pin 36 on the fly-wheel 5. Meanwhile, as the pause operating member 11 is pushed in to its actuated position, the pressing pin 28 thereon presses against the arm 15b of the pinch lever 12 to pivot the pinch lever 12 in the counterclockwise direction around the shaft 14 to move the pinch roller 4 away from the capstan shaft 3. The pinch lever 12 thereafter remains at the position. In the meantime, the arm 15a of the pinch lever 12 presses against the pin 26 on the lever 23 to pivot the lever 23 in the counterclockwise direction to a position in which the pinch roller 4 is spaced away from the capstan shaft 3. Also the lever 23 thereafter remains at the position. Thus, it will be appreciated that a pause mechanism is constituted from the pressing pin 28 on the pause operating member 11, the arm 15b of the pinch lever 12, the pinch lever 12, the other arm 15a of the pinch lever 12, the pin 26 on the lever 23, and the lever 23.

Then when the predetermined interval of time formerly set to the timer TM elapses, the timer TM produces a signal indicating this, and in response to the signal, the switch SW2 is closed again to connect the motor 6 to the power source so that the motor 6 starts its rotation. At the same time, the recording/reproducing circuit is also connected to the power source and thus rendered operative. As the motor 6 is rotated, the fly-wheel 5 is driven to rotate thereby. Within one full rotation of the fly-wheel 5, the releasing pin 36 on the fly-wheel 5 will approach and finally engage with an end portion of the pawl 35 of the arresting plate 30. Consequently, the arresting plate 30 will thereafter be pivoted in the clockwise direction as shown in phantom in FIG. 2 by the releasing pin 36. When the arresting plate 30 is pivoted to a particular angular position, the arresting pin 29 on the pause operating member 11 is released from the arresting shoulder 34 of the arresting plate 30. Consequently, the pause operating member 11 is returned to its home position by the return spring 27. As the pause operating member 11 is returned in this manner, the arm 15b of the pinch lever 12 will no more be pressed by the pressing pin 28 on the pause operating member 11. Consequently, the pinch lever 12 is pivoted in the clockwise direction by the coil spring 17 to press the pinch roller 4 thereon against the capstan shaft 3 and to pivot the lever 23 in the clockwise direction around the capstan shaft 3 to move the gear 21 into meshing engagement with the gear 22. Consequently, the reel receiver 2 begins its rotation, thereby starting automatic recording by the automatic recording apparatus.

In this manner, the pause operating member 11 is released from its arrested position utilizing the turning force of the fly-wheel 5 which is driven to rotate by the motor 6. Accordingly, as distinct from a conventional apparatus wherein an electromagnetic plunger is employed for such releasing operation, construction of the releasing mechanism can be simplified significantly, and accordingly reduction in number of parts and in size of the releasing mechanism can be realized.

Figure 3:
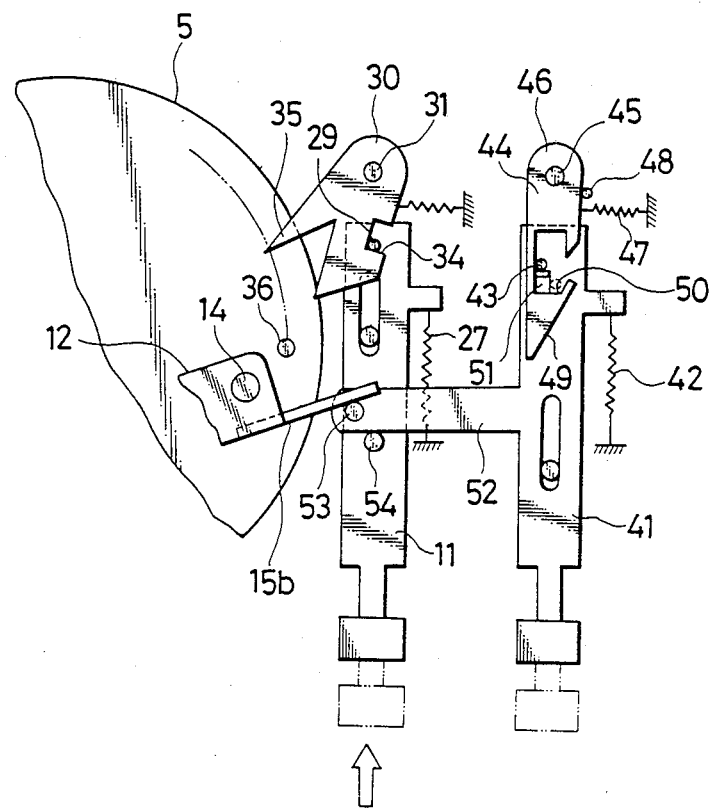
FIG. 3 is a schematic plan view illustrating general construction of an automatic recording apparatus of a second embodiment of the invention.

It is to be noted that the present invention is not limited to the specific embodiment described above. Particularly, while in the embodiment described above the pause operating member 11 is provided so that it may be used only for automatic recording operation, a second pause operating member may additionally be provided for selectively establishing a pause mode of the automatic recording apparatus while the automatic recording apparatus is operating for normal recording or reproduction. Referring to FIG. 3, such a modification is shown. The modified apparatus includes an additional pause operating member 41 mounted for movement between a home position and an actuated position and urged by a spring 42 so that it may be automatically returned to its home position when allowed. An arresting pin 43 is erected uprightly at an end portion of an upper face of the second pause operating member 41 and is located for engagement with an arresting mechanism 44 of the double action type to selectively arrest the second pause operating member 41 at its actuated position. The arresting mechanism 44 includes an arresting plate 46 mounted for pivotal motion around a fixed shaft 45 and also for limited lateral pivotal motion, that is, pivotal motion within a plane of the shaft 45, a spring 47 for urging the arresting plate 46 in a counterclockwise direction around the shaft 45, and a pin 48 for limiting the counterclockwise pivotal motion of the arresting plate 46. The arresting plate 46 has formed thereon an inclined end face 49 for converting a pressing force of the arresting pin 43 of the second pause operating member 41 into a force to pivot the arresting plate 46 in a clockwise direction, an arresting shoulder 50 for arresting the arresting pin 43 of the second pause operating member 41 after being advanced along the inclined end face 49 of the arresting plate 46, and an obliquely laterally bent lug 51 which is located adjacent the arresting shoulder 50 and extends obliquely laterally from a plane of the arresting plate 46. Thus, if the pause operating member 41 is pushed in to its actuated position for the first time, the arresting pin 43 is first slidably engaged with the inclined end face 49 of the arresting plate 46 to pivot the arresting plate 46 in the clockwise direction around the shaft 45, and then when the arresting pin 43 rides over the inclined end face 49 and comes to an entrance of an opening of the arresting plate 46 partly defined by the arresting shoulder 50 and the lug 51, the arresting plate 46 is allowed to pivot in the clockwise direction so that the arresting pin 43 is admitted into the opening of the arresting plate 46 and is thus engaged by a side edge of the obliquely laterally bent lug 51 and the arresting shoulder 50 as shown in a broken line in FIG. 3 so that the pause operating member 41 will thereafter be arrested at its actuated position when the pause operating member 41 is released. Then, if the the pause operating member 41 is manually pushed in for the second time, the arresting pin 43 is further advanced from the arrested position and disengaged from the side edge of the obliquely laterally bent lug 51 so that the arresting plate 44 is further pivoted a little in the counterclockwise direction until the the arresting pin 43 comes to a position forwardly of and in alignment with the obliquely laterally bent lug 51 of the arresting plate 44. Accordingly, if the pause operating member 41 is subsequently released from manual operation, the arresting pin 43 is moved toward its home position and thus slidably engaged with an inclined face of the obliquely laterally bent lug 51 of the arresting plate 44 to rock the arresting plate 44 a little in a lateral direction within a plane of the shaft 45 thereby to allow the arresting pin 43 to be returned to its home position by the spring 42. The pause operating member 41 has a lateral projection 52 formed at a mid portion of a side thereof and extending to a position above the first pause operating member 11. The second pause operating member 41 has a pin 53 located at an end portion of an upper face of the projection 52 thereof for selectively pressing against the arm 15b of the pinch lever 12 while the first pause operating member 11 has a pin 54 erected uprightly thereon for engaging with the projection 52 of the second pause operating member 41 to move the second pause operating member 41 forwardly when the first pause operating member 11 is pushed in to its actuated position. It is to be noted that the arresting pin 43 is located on the second pause operating member 41 such that when the first pause operating member 11 is pushed in until it is arrested at its actuated position by the arresting plate 30, the arresting pin 43 is positioned just forwardly of the obliquely bent lug 51 of the second pause operating member 41.

With the construction just described, when it is intended to establish a pause mode when the automatic recording apparatus is operating for normal recording or reproduction, only the pause operating member 41 must be pushed in to its actuated position. On the other hand, when it is intended to establish a pause mode in order to perform automatic recording, the only necessary operation is to push in the pause operating member 11 to its actuated position.

It is to be noted that while the arrangement shown in FIG. 3 is constituted such that the first pause operating member 11 pivots the pinch lever 12 via the second pause operating member 41, it is also possible to employ an alternative arrangement wherein the second pause operating member 12 can be pivoted individually by the first and second pause operating members 11, 41 with the pin 54 possibly replaced by a lateral bent projection of the first pause operating member 11.

Further, while in the embodiments described above the turning force of the fly-wheel 5 is utilized to cancel the arrested condition of the pause operating member for automatic recording, a turning force of a reel base may be utilized to perform the canceling operation. Further, the arresting plate 30 may be divided into two parts in order to reduce the stroke of pivotal motion thereof.

As apparent from the foregoing description, according to the present invention, an arrested condition of a pause operating member for automatic recording (stand-by mode selecting operating member) is canceled utilizing an operating force of a continuously operating member such as a fly-wheel. Accordingly, an automatic recording apparatus can be provided which can be simplified in construction and reduced in number of parts and in overall size comparing with a conventional apparatus wherein an arrested condition of such a pause operating member is canceled using an electromagnetic plunger.

Having now fully described the invention, it will be apparent to one of ordinary skill in the art that may changes and modifications can be made thereto without departing from the spirit and scope of the invention as set forth herein.

What is claimed is:

1. An automatic recording apparatus, comprising:
   a normally rotating rotary member;
   a reel receiver normally connected to said rotary member for rotating a tape reel received thereon;
   a stand-by mode selecting operating member manually movable from a home position to an actuated position and normally urged to the home position;
   arresting means for arresting said stand-by mode selecting operating member at the actuated position;
   a pause mechanism for interrupting a rotation transmitting route from said rotary member to said reel receiver to establish a recording mode stand-by condition when said stand-by mode selecting member is at the actuated position;
   controlling means responsive to movement of said stand-by mode selecting operating member from the home position to the actuated position for stopping rotation of said rotary member and responsive to a starting signal for starting rotation of said rotary member; and
   releasing means for transmitting a turning force of said rotary member at an initial stage after starting of its rotation to move said arresting means out of arresting engagement with said stand-by mode selecting operating member to allow said stand-by mode selecting operating member to return from the actuated position to the home position, thereby canceling the recording mode stand-by condition.

2. An automatic recording apparatus according to claim 1, wherein said continuously operating member is a capstan fly-wheel.

3. An automatic recording apparatus according to claim 1, wherein said continuously operating member is a reel base.

4. An automatic recording apparatus as claimed in claim 1, wherein said arresting means and said releasing means include a common movable member which is moved, in response to movement of said stand-by mode selecting operating member from the home position to the actuated position, in a direction from a first position to a second position in which said movable member arrests said stand-by mode selecting operating member at the actuated position and is partially located on a locus of turning motion of a portion of said rotary member so that, during one full rotation of said rotary member after starting of its rotation, said movable member may be engaged by the portion of said rotary member and moved by the latter further in the same direction out of arresting engagement with said stand-by mode selecting operating member.

5. An automatic recording apparatus as claimed in claim 4, wherein said common movable member is a pivotally mounted lever having an arm for engagement with said portion of said rotary member, a camming edge which is engaged, when said stand-by mode selecting operating member is moved from the home position to the actuated position, by an element on said stand-by mode selecting operating member to pivot said common movable member from the first position to the second position, and an arresting edge for engaging with said element on said stand-by mode selecting operating member to arrest said stand-by mode selecting operation member at the actuated position.

6. An automatic recording apparatus as claimed in claim 5, wherein said lever has another arm on which said camming edge and said arresting edge are formed.

7. An automatic recording apparatus as claimed in claim 5, wherein said common movable member is urged in a direction from the second position to the first position and normally held at the first position by said stand-by mode selecting operating member at the home position.

8. An automatic recording apparatus as claimed in claim 1, wherein said controlling means includes a switch for detecting movement of said stand-by mode selecting operating member from the home position to the actuated position and for delivering a detection signal, said controlling means stopping rotation of said rotary member in response to a detection signal from said switch.

9. An automatic recording apparatus as claimed in claim 8, wherein said controlling means further includes means for producing a starting signal after a predetermined interval of time after reception of the detection signal from said switch.

10. An automatic recording apparatus as claimed in claim 9, further comprising a motor coupled to said rotary member, said controlling means further including switch means which is opened to disable energization of said motor when said controlling means receives a detection signal from said switch and is closed to enable energization of said motor when said controlling means received a starting signal.

11. An automatic recording apparatus as claimed in claim 1, further comprising a second operating member manually movable from a home position further than an actuated position, and an arresting mechanism operable upon first manual movement of said second operating member for arresting said second operating member at the actuated position and operable upon second manual movement of said second operating member for allowing said second operating member to return from the actuated position to the home position, said pause mechanism interrupting said rotation transmitting route from said rotary member to said reel receiver also when said second operating member is at the actuated position.

12. An automatic recording apparatus as claimed in claim 11, wherein said controlling means includes means for producing a starting signal after a predetermined interval of time after stopping of rotation of said rotary member.

* * * * *